March 12, 1968     TAKEO KATO     3,372,429
MANUFACTURE OF DOUBLE-WALLED HOLLOW PLASTIC PRODUCT
Filed Feb. 28, 1964     4 Sheets-Sheet 3

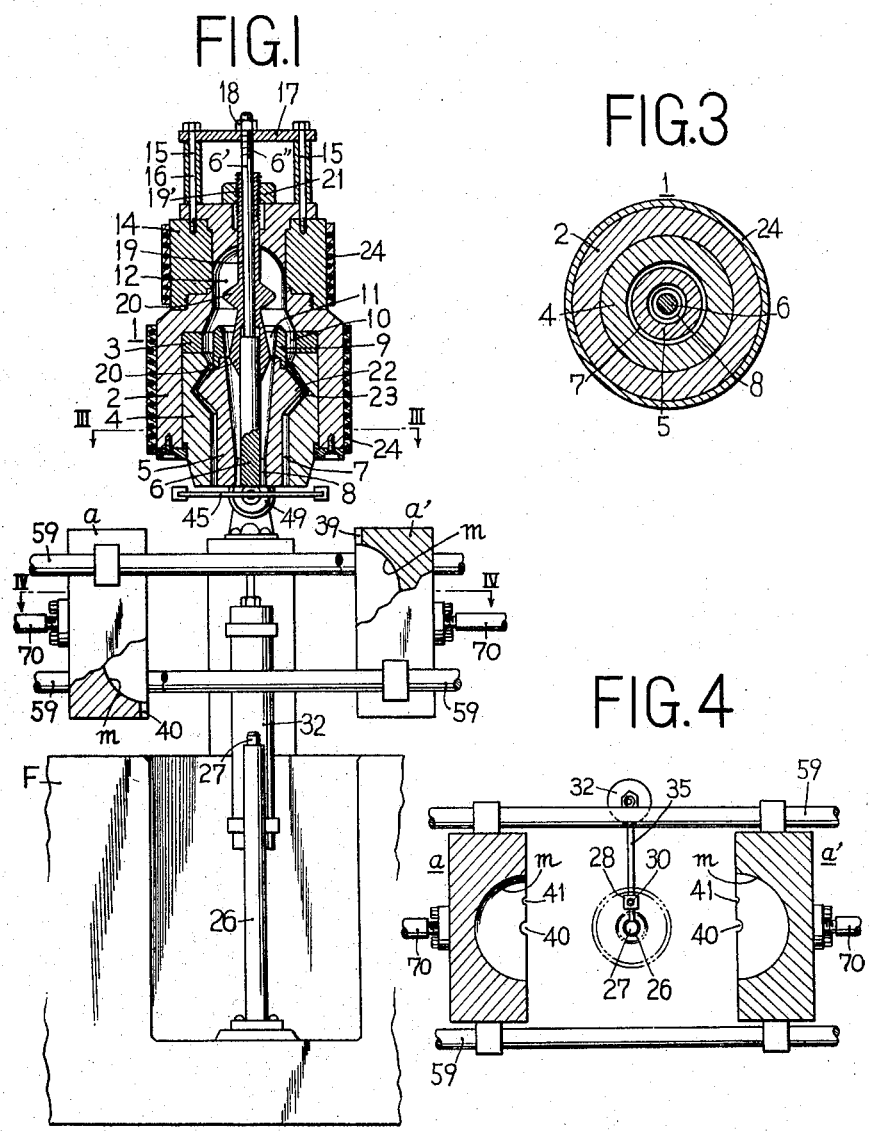

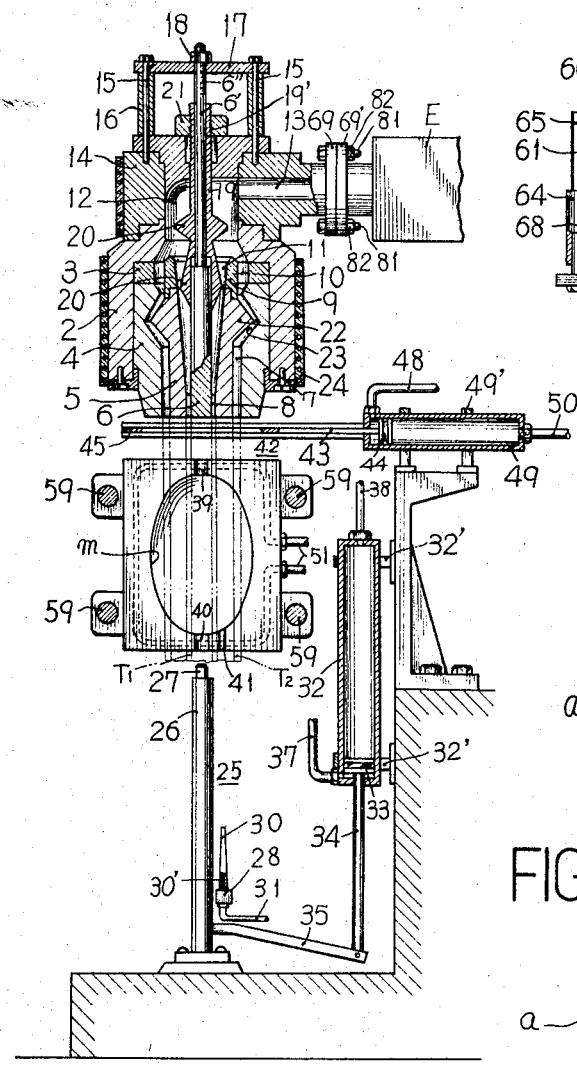
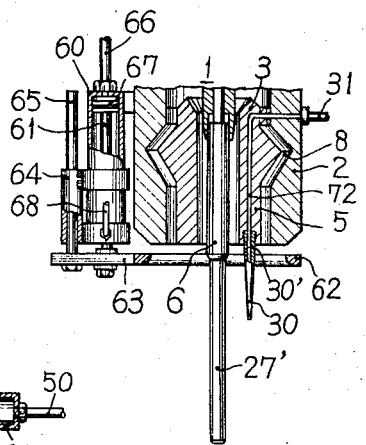
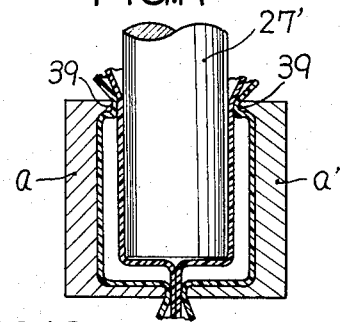
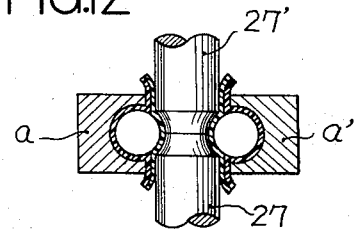

March 12, 1968  TAKEO KATO  3,372,429
MANUFACTURE OF DOUBLE-WALLED HOLLOW PLASTIC PRODUCT
Filed Feb. 28, 1964  4 Sheets-Sheet 4

United States Patent Office 3,372,429
Patented Mar. 12, 1968

3,372,429
MANUFACTURE OF DOUBLE-WALLED
HOLLOW PLASTIC PRODUCT
Takeo Kato, Ota-ku, Tokyo, Japan, assignor to Kabushiki
Kaisha Kato Seisakujo, Tokyo, Japan
Filed Feb. 28, 1964, Ser. No. 348,187
Claims priority, application Japan, Mar. 4, 1963,
38/11,223
7 Claims. (Cl. 18—5)

This invention relates to the manufacture of hollow plastic products, more particularly to the manufacture of double hollow plastic products.

Conventionally, various methods and apparatuses for blow molding plastic tube into hollow plastic products having a single wall have been employed, however, double-walled seamless hollow article as well as method and apparatus for blow molding the same have been not only realized as yet, but also unknown in the art.

Therefore, it is an object of this invention to provide seamless double-walled hollow plastic products.

Another object of this invention is to provide a completely new and highly effective method and apparatus for continuously blow molding the aforementioned products with a single process.

Further object of this invention is to provide said products without skilled operation and at lower cost.

Such objects can be fully carried out in accordance with the present invention.

According to the present invention, it is possible to obtain seamless double-walled hollow plastic products by periodically extruding plastic material into the form of a double-walled tube and then applying a blowing pressure medium between the double walls of each tube below means for substantially making said pressure medium effective.

Further, in order to carry out said objects, the present invention provides an apparatus for producing double-walled hollow plastic products, comprising die element including internal mold, intermediate mold and external mold for extruding from double slits a fluidized plastic material being supplied from an extruder into the form of double-walled tube, core mold, spilt mold elements adapted to be registered with each other for holding said tube between said core mold and said split mold element, and blow-pin adapted to be inserted between the inner and outer tubes so as to blow pressure medium therebetween.

Examples of the aforementioned double-walled hollow plastic products manufactured in accordance with the present invention are float and buoy for fishing net, heat-insulating container such as thermos, jar and the like, shock-absorber, protecting cover of container, or other various articles.

The plastic material which can be employed in the present invention includes polyethylene, polyvinyl chloride, polycarbonate, polyamide, polyacetal, polyether chloride, and other various thermoplastic materials which have been already known in the art or will be known in the art in the future. The product of the present invention may be either transparent or opaque.

Other specific objects, features, compositions, effects and advantages of the present invention will be clearly understood from the following explanation made in conjunction with the accompanying drawings, wherein:

FIG. 1 is a diagrammatic front view in vertical section, partly cut away, of the apparatus of the present invention;

FIG. 2 is a diagrammatical side view taken in vertical section thereof;

FIG. 3 is a sectional view of the die portion shown in FIG. 1, said view being taken along the line III—III of FIG. 1;

FIG. 4 is a sectional view taken along the line IV—IV of FIG. 1;

FIGS. 10 through 12 are enlarged vertical sectional views of the respective portions of another embodiment of the present invention;

Figure 5:
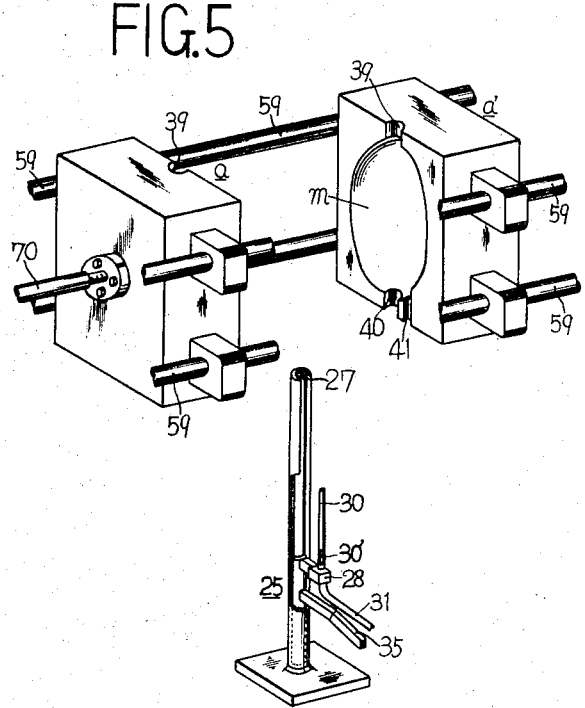
FIG. 5 is a perspective view, partly cut away, illustrating the relation between the split mold and the core mold.

Referring to FIGS. 1 and 2, a die element 1 is connected to an extruder E by means of flanges 69, 69', bolt and nut 81, 82 and the like. The die element 1 is constructed as follows: In the interior upper side of a die case 2 is inserted a breaker plate 3 having outer and inner passage-ways 10 and 11 separated by a partition 9, an outer mold 4 is fitted below said breaker plate 3, an intermediate mold 5 is suspended by screwing the same in the lower portion of the partition 9 of said breaker plate within said outer mold, and further an inner mold 6 is suspended from above internally of said intermediate mold 5 thereby forming an outer tube molding annular slit 7 communicating with said outer passageway 10 between said outer and inner molds 4 and 5 and further forming an inner tube molding annular slit 8 communicating said inner passageway 11 between said intermediate and inner molds 5 and 6.

On the upper face of the die case 2 is mounted a window member 14 having a passageway 12 communicating with both of said inner and outer passageways 10 and 11 and a passageway 13 opening toward the extruder E, thereby extruding from said slits 7, 8 hot molten plastic material being delivered from the extruder into the form of a double-walled tube. Further, the size and width of the slits can be freely varied corresponding to the thickness of the tube, thus permitting changes in the thickness of the inner and outer tubes.

A beam 17 is supported on the upper face of said window member by means of bolts 15 and stays 16. A rod member 6' disposed above said inner mold 6 is projected upwards through said window member 14 and beam 17, and said inner mold 6 is supported on said beam 17 by means of a thread portion 6" provided on the upper end of said rod member and a nut 18. The reference numeral 19 represents a sleeve provided with a flow controlling projection 20 slidably fitted in the upper portion of said inner mold 6, the upper end of said sleeve being projected above said window member 14 and said sleeve being adapted to be raised and lowered by means of a thread portion 19' formed on the projected end thereof and a nut 21. The reference numeral 22 represents a projection for mixing the plastic material, the reference numeral 23 represents a concave formed in the outer mold 6 corresponding to said projection, and the reference numeral 24 represents a band heater.

Next, a pair of split mold elements $a$ and $a'$ forming a production mold are supported by a stay 50 which is in turn supported on a frame F by means of, for example, a fixed plate or the like below said die element 1, and the split mold elements are freely slidable to the right and to the left by means of an actuating rod 70 which is driven directly or indirectly by a suitable driving mechanism (not shown) such as, for example, a pressure oil pump. In most of the views showing the molding operation, the split mold elements are shown as being opened.

As shown in FIGS. 1, 2 and 4, the core mold element 25 is fixed on the frame F at a suitable position below the split mold sections *a* and *a'* to be combined with each other right below said die element 1, a round rod-shaped core mold 27 having a height corresponding to the height of the split mold elements is inserted in a sheath 26 which is upwardly fixed, an attachment 28 fixed on the lower portion of the core mold 27 is projected from a guide groove 29 formed in the direction of the generating line of said sheath 26, and a slightly tapered blow pin 30 having a through-aperture 30 axially formed therethrough is so disposed as to upwardly project. The reference numeral 31 represents a pipe connected to said blow pin 30, said pipe 31 being also connected to an air-compressor (not shown). There are various types of mechanism for raising and lowering this core mold, and, for example, in case that pressure oil pump is employed, and pressure oil cylinder 32 may be fixed to the frame F by a connecting member 32 in parallelism with said sheath 26, one end of a connecting rod 35 may be secured to the lower end of rod 34 of a piston 33 and which may be fixed to the lower end portion of the core mold 27 through said guide groove 29 of the connecting rod, the core mold 27 and hence the blow pin secured thereto will be raised through the connecting rod 35 by raising the piston 33 by transferring oil from an oil pressure pipe thereto and, when said pipe is changed over to another pressure oil pipe 38, said core mold and blow pin secured thereto may be lowered, namely, the operation is reverse to the above.

As shown in FIGS. 2, 4 and 5, said split mold halves *a* and *a'* have respectively a mold cavity *m* having in the upper and lower portions thereof arcuate concaves 39, 40 which register with said core mold 27, and a concave 41 registering with said blow pin 30 is formed on one side of said concave 40.

Figure 6:
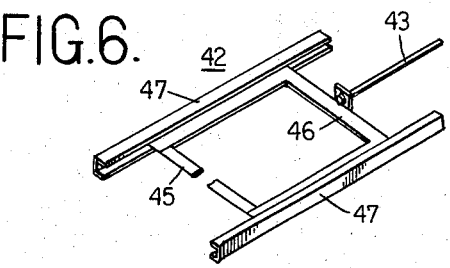
FIG. 6 is a perspective view of the cutting means.
Figure 8:
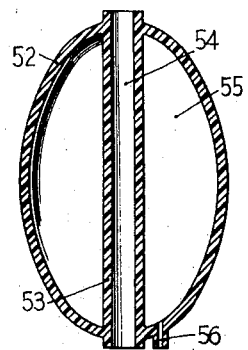
FIG. 8 is an enlarged front view, partly cut away, of the resultant molded preform.

The reference numeral 42 indicates a cutting device located on the lower surface of the die element. While various types of cutting device can be utilized, explanation will be made herein with reference to FIGS. 2 and 6. The pressure oil cylinder 49 is mounted to said frame F by means of a supporting member 49, and a knife mounting frame 46 is connected to the front end of a piston rod 43 having one end secured to the piston 44 and the other end projected out of the cylinder 49. This knife mounting frame 46 is slidably supported on two rails 47, 47, and a cutting knife 45 is provided on the front end of said knife mounting frame 46.

Since oil pipes 49 and 50 are disposed on one side (left side of FIG. 1 in this embodiment) and on the other side relative to the piston 44, respectively, the knife 45 is moved across the lower face of the die element 1 so as to cut the tube by pushing the piston to the right by delivering oil from the pressure oil pipe 48 in the state shown in FIG. 1, and the piston will be moved to the left and thus returned to the original position thereof by switching the pressure oil pipe to another pressure oil pipe 50. Further, the knife may as well be double-edged for effecting the cutting of the pipe during the leftward movement of the knife.

Description will be made as to the operation for manufacturing the double-walled hollow plastic product by employing the apparatus of the present invention.

In the first place, there will be described the production of a float made of polyethylene for a fishing net. The mold cavity shown in the drawings has a suitable shape. Polyethylene plastic material is molten into a hot material in fluidized state and which is delivered under pressure from the extruder E into the passageway of said die element 1. The plastic material is channeled into the inner and outer passageways 10, 11 of the breaker plate through the passageway 12 and extruded in the form of inner and outer coaxial double tubes T1 and T2 through the annular slits 7, 8, respectively. Next, the present invention will be described with reference with each of FIGS. 7 through 13. In FIGS. 7*a*–7*e*, with one half of the split mold being removed, the mold cavity portion of the other split mold is shown as seen from the front side thereof, and the double-walled plastic tube is shown as being vertically cut and disposed in front of the split mold.

Figure 7A:
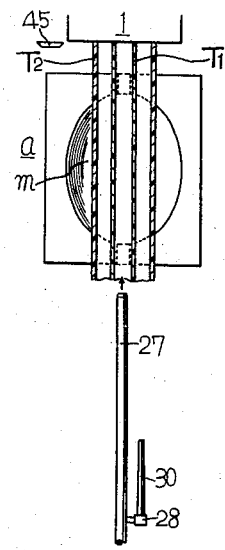
FIGS. 7a–7e are diagrammatic views showing the sequence of the molding operation, respectively.
Figure 7B:
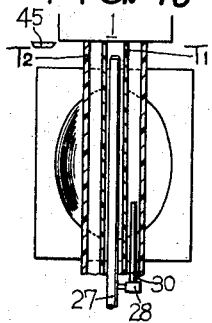
Figure 7C:
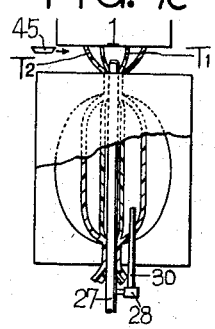
Figure 7D:
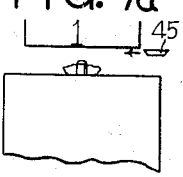
Figure 7E:
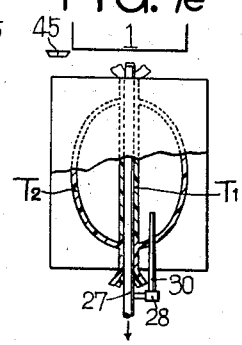

In extruding system, the plasticizing temperature of the plastic material, extruding speed, extruded amount, and other conditions may be similarly determined as in the case of a single-walled tube. Additionally, a desired amount of the double-walled tube to be extruded can be determined depending upon the overall section of the desired tube as in the case of a single-walled tube. When the extruded double tube is suspended by a desired length, as shown in FIG. 7*a*, the core mold 27 will be inserted in the inner tube of the double tube and then reach the position corresponding to the upper concave 39 of the split mold elements by raising the core mold 27 and the blow pin by delivering pressure oil from the pressure oil pipe. Simultaneously, the blow pin 30 will be moved into the gap formed between the inner and outer tubes. With particular reference to FIG. 2, when the split mold sections *a* and *a'* are registered with each other, said double tube is held between the split mold and the core mold, as shown in FIG. 7*c*, and then the core mold 27 will be held within the concaves 39, 39 and 40, 40 of the both split mold sections, while the blow pin 30 will be held within the concaves 41, 41. Subsequently, the knife is moved by delivering oil from the pressure oil pipe so as to cut said double tube (see FIG. 7*d*), the knife is returned to the original position thereof by immediately delivering the pressure oil from the pressure oil pipe 50, compressed air is blown from the blow pin 30 into the space between the inner and outer tubes of the double tube by delivering the compressed air from a pressure air pipe 31, and thus the double tube is blow-molded by pressing the inner tube against the circumferential surface of the core mold 27 and pressing the outer tube against the surfaces of the mold cavities *m, m* of the split mold (FIG. 7*e*). The blown product is cooled by a water jacket 51 circulating the inside of the respective split mold sections. After sufficiently blow-molding, the supply of the aforementioned compressed air is stopped, and then the core mold 27 and the blow pin 30 are lowered by opening the split mold sections *a, a'* to the left and to the right and by switching from the pressure oil pipe 50 to the pressure oil pipe 38. When said core mold 27 is retracted into the sheath 26, the molded product will fall down from the core mold and then transferred to a desired place by means of a conveyor or other suitable transferring means (not shown).

The aforementioned molded product is a rigid seamless double-walled hollow article provided with an outer wall 52 and an inner wall 53 integral therewith forming a hollow portion 54, wherein a hollow portion 55 is formed between the inner and outer walls.

Figure 9:
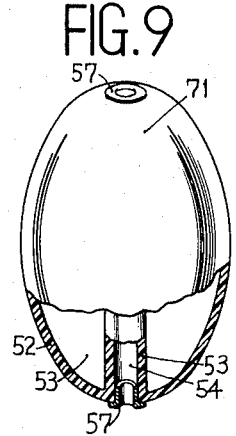
FIG. 9 is a perspective view of a double-walled hollow plastic product made of the molded preform shown in FIG. 8.

By fusing the portion of the blow pin hole 56 by means of a trowel or the like, a fishing net float 71 as shown in FIG. 9 can be readily obtained. A mouth piece 57 may be fitted in the opening portion of the hollow portion 54 by pressing the same therein with the application of heat, as desired. When it is desired to employ the resultant float, a rope of the fishing net is inserted through the hollow portion 54 thereby attaching the float to the net. Further, a spherical float can be molded by making the mold cavity of the split mold hemi-sphere shaped. In this case, the molding condition is not particularly different from the above.

FIG. 10 illustrates a modified apparatus for carrying out the present invention, wherein the core mold and the blow pin are mounted on the upper portion thereof. In this apparatus, the inner mold 6 of the previous example is downwardly extended so as to form the core mold 27, a blow pin 30 is provided on the lower end surface of the intermediate mold 5 in downwardly projecting relationship, a passageway 59 communicating with this blow pin is opened from said intermediate mold, through the breaker plate 3 and through the die case 2, to the outside, and the compressed air pipe 31 of the previous example is connected with the passageway 59. In this case, said core mold 27 and the blow pin become stationary. Various types of tube cutting device can be utilized as desired, however, the drawing shows a stripper device. That is to say, a shank 63 of a ring-shaped stripper 62 is fixed to the front end of a piston rod of a cylinder 60 and to the front end of a rod 65 which is slidably supported in the sheath 64 disposed in parallelism with said cylinder 60, the stripper 62 is lowered by pushing a piston 67 by delivering oil to a pressure oil pipe 66 so as to strike down the molded product by the ring portion and then the stripper 62 is returned to its original position by delivering pressure oil from the pressure oil pipe 68. Other respects are similar to the previous example, namely, the operation is performed in such an order as extrusion of double tube—registering split mold sections—blowing compressed air—opening split mold—lowering stripper, and thus a double-walled hollow product can be obtained as in the case of the previous example.

In accordance with the present invention, various double-walled hollow products can be made by modifying the respective portions of the mechanism. In some examples, the inner mold and the core mold can be made bigger, thereby obtaining thermos whose hollow portion 54 is utilized as a reservoir, jars, outer protecting cover of other containers 73 and the like. Since the inner and outer walls 52, 53 of this cover is integrally formed, the cover becomes seamless, so rigid that the contents can be well protected, attractive in appearance, and so light in weight that the same can be easily handled.

Figure 13A:
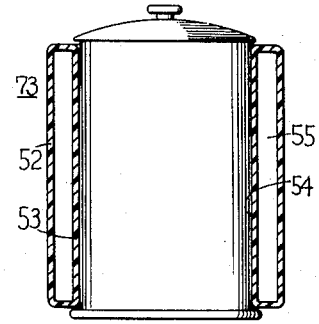
FIGS. 13a through 13e are enlarged vertical sectional views of other products.
Figure 13D:
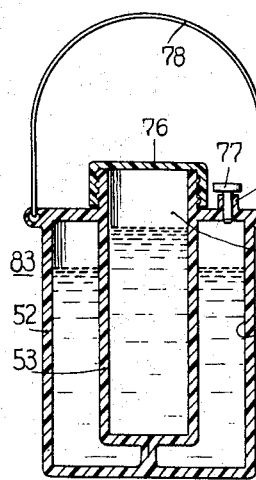
Figure 13B:
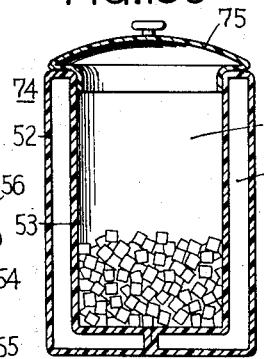

FIG. 11 illustrates a manner in which the molding operation is carried out by utilizing split mold sections a, a' provided with only one of the concaves 39, 39 and by combining the split mold sections together making the front end of the core mold 27 unable to reach the bottom of the mold cavity of the split mold. While this drawing shows a mode in which molding operation is carried out by means of mechanism adapted to enable the extended lower portion of the die element to serve as a core mold 27, as explained hereinafter, it is also possible to carry out the molding operation by utilizing the above-mentioned type of mechanism using the core mold 27 which is adapted to be pushed upwards from the below. In any event, it is possible to obtain a container 74 having hollow wall as shown in FIG. 13b by carrying out the blow-molding operation in such state as described above. Such container provided with a closure 75 can be employed as a heat-insulating container whose hollow portion 54 serves as a reservoir in which either boiled food, rise or the like can be stored for maintaining them at an elevated temperature or ice, cold beverage or the like can be stored so as to keep the same cool.

Figure 13E:
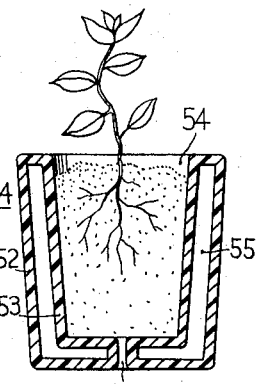
Figure 13C:

The container is characterized by being capable of preventing the leakage of water, liquid and the like contained therein. In this case, the container can also be employed as a double container for beverage, liquid cosmetics, medicine and so forth by providing the reservoir with a closure 76 and by fitting a plug 77 without closing the blow pin hole 56. The reference numeral 78 represents a grip handle. FIG. 13e shows a flower pot, and in this case the molding thereof has been carried out by employing fine core molds which are projected from the front end of the core mold 27' or 27 shown in FIG. 11 corresponding to water draining apertures 79.

FIG. 12 shows a modified mode in which are employed both an upwardly directed core mold 27 adapted to be raised and lowered and another downwardly directed stationary core mold 27' which is extended from the lower end of the inner mold 6. In this example, a tyre 80 shown in FIG. 13c can be obtained by performing the blow-molding operation in the same manner as each of the previous examples with the exception of curving the circumference of the front end portion of the both core molds and by registering the split mold sections a, a' having a mold cavity, which is semi-circular in section, relative to the abutting point of the both core molds. The resultant tyre has a rigidity which has never been experienced in conventional ones and which can be also employed as a cushion or the like attached to the side of a ship. By making said curved surface into a convex form or other suitable form, it is possible to obtain products of varied shape, and also it is possible that the core mold and the concave of the split mold sections which encircles the core mold can be differently shaped by suitably designing the same.

In order to facilitate the understanding of the present invention, explanation has been made only as to the examples in which one double-walled hollow product is manufactured at one time, namely, a pair of split mold sections are employed, however, the present invention can be also applied to any or all of the respective split mold sections of an apparatus capable of manufacturing two or more articles of this kind at one time, namely, adapted for mass production.

It should be understood that double-walled hollow products such as double-walled hollow bottle, tumbler, toy, model, test tube, flask, umbrella rib and the like can be readily obtained by referring to the respective examples previously described, although detailed description has not been made in this respect for the purpose of simplifying the explanation.

From the above description, it is proved that the present invention can provide a seamless double-walled hollow plastic product which is unknown in the art, method of easily manufacturing the same with a single process, and apparatus therefor which is a blow-molding machine that is very effective in operation, less complicated in respect of construction, design, usage and maintenance, and hence can be produced at lower cost.

Although specific embodiments of the present invention have been illustrated and described for the purpose of explanation of the present invention, it is clear from the entire description made in the specification and the appended claims that various modifications will be possible without departing from the spirit and scope of the present invention.

What I claim is:

1. An apparatus for manufacturing double-walled hollow plastic product, comprising an extruder, a die element adapted to periodically extrude from double inner and outer slits a fluidized plastic material being supplied from said extruder into the form of a double-walled tube, an axially movable lower core mold member adapted to be disposed in the center of said double-walled tube, split mold elements adapted to be registered with each other for holding said double-walled tube therebetween relative to said core mold member, and a blow pin to be inserted between the walls of said double-walled tube so as to blow a pressure medium therebetween, wherein said die element includes an inner mold, intermediate mold and outer mold and is provided with double-slits for forming a double-walled tube, said inner mold being provided with an extended member in the lower portion thereof which forms a separate core mold member, the separate core mold member and the lower core mold member are adapted to be separably contiguous with each other so as to form a core mold as an axial body, and said double-walled tubular body is adapted to be disposed over the upper and lower members of said core mold.

2. In apparatus for manufacturing double-wall hollow plastic products, the combination of an extruding die comprising an inner die member, an annular intermediate die member and an annular outer die member concentric with one another and radially spaced apart to provide an annular inner extrusion orifice between said inner die member and intermediate die member and an annular outer extrusion orifice between said intermediate die member and said outer die member; means for periodically supplying fluidized plastic material under pressure to said extruding die to extrude simultaneously a tubular inner parison from said inner orifice and a tubular outer parison from said outer orifice; a split mold comprising mold elements movable toward one another in a direction perpendicular to said parisons to embrace said parisons and adapted to register with one another to form a complete mold; a core mold concentric with said die members and movable axially relative to said inner die member; means for moving said core mold axially into said inner parison, said core mold having a cross section less than that of said inner die member whereby said core mold is freely insertable in said inner parison, and a blow pin insertable between said parisons to blow a pressure medium therebetween to conform said outer parison to said split mold and to conform said inner parison to said core mold.

3. Apparatus according to claim 2, in which said extruding die is mounted above said split mold and said core mold is mounted below said split mold and is axially movable up into said split mold.

4. Apparatus according to claim 3, in which parison cutting means is provided between said extruding die and said split mold.

5. Apparatus according to claim 2, in which said blow pin is movable jointly with said core mold.

6. Apparatus according to claim 2, comprising means variably controlling the supply of said fluidized plastic material to one of said die orifices to provide equal rates of extrusion of said inner and outer parisons.

7. In apparatus for manufacturing double-wall hollow plastic products, the combination of an extruding die comprising an inner die member, an annular intermediate die member and an annular outer die member concentric with one another and radially spaced apart to provide an annular inner extrusion orifice between said inner die member and intermediate die member and an annular outer extrusion orifice between said intermediate die member and said outer die member, means for periodically supplying fluidized plastic material under pressure to said extruding die to extrude simultaneously a tubular inner parison from said inner orifice and a tubular outer parison from said outer orifice; a split mold provided below said extrusion die and comprising mold elements movable toward one another in a direction perpendicular to said parisons to embrace said parisons and adapted to register with one another to form a complete mold; a core mold extruding downwardly from said inner die member into said split mold and having a smaller cross sectional size than said inner die member, a blow pin projecting downwardly from said intermediate die member in position to be inserted between said inner and outer parisons, means for supplying a pressure medium to said blow pin to blow pressure medium between said parisons to conform said outer parison to said split mold and to conform said inner parison to said core mold and molded body stripping means provided below said extruding die and comprising a lever, a ring member carried on the front end of said lever and surrounding said core mold and driving means for moving said lever and ring downwardly to strip a molded body from said core mold after said split mold has opened.

References Cited
UNITED STATES PATENTS

| | | | |
|---|---|---|---|
| 3,103,036 | 9/1963 | Nave et al. | 18—5 |
| 3,109,198 | 11/1963 | Guignard | 18—146 XR |
| 3,196,592 | 7/1965 | Cheney | 18—5 |

WILBUR L. McBAY, *Primary Examiner.*

ALEXANDER H. BRODMERKEL, J. SPENCER OVERHOLSER, *Examiners.*

A. R. NOE, *Assistant Examiner.*